April 7, 1970 L. K. FREVEL ET AL 3,505,008
SEPARATION OF FLY ASH AND SULFUR DIOXIDE FROM FLUE GASES
Filed Oct. 30, 1967 3 Sheets-Sheet 3

INVENTORS.
Ludo K. Frevel
BY Leonard J. Kressley

William R. Norris
ATTORNEY

United States Patent Office 3,505,008
Patented Apr. 7, 1970

3,505,008
SEPARATION OF FLY ASH AND SULFUR
DIOXIDE FROM FLUE GASES
Ludo K. Frevel, Midland, and Leonard J. Kressley, Saginaw, Mich., assignors to The Dow Chemical Company, Midland, Mich., a corporation of Delaware
Filed Oct. 30, 1967, Ser. No. 678,922
Int. Cl. B01d 53/34, 53/04
U.S. Cl. 23—2          15 Claims

ABSTRACT OF THE DISCLOSURE

Method of removing fly ash and acidic gases such as sulfur dioxide from the gases which comprises passing the flue gases through a thin porous bed of alkali metal bicarbonate crystals of a mesh size predominantly in the range of 20 to about 120 mesh at a temperature between about 0° C. and 125° C.

---

Figure 1:
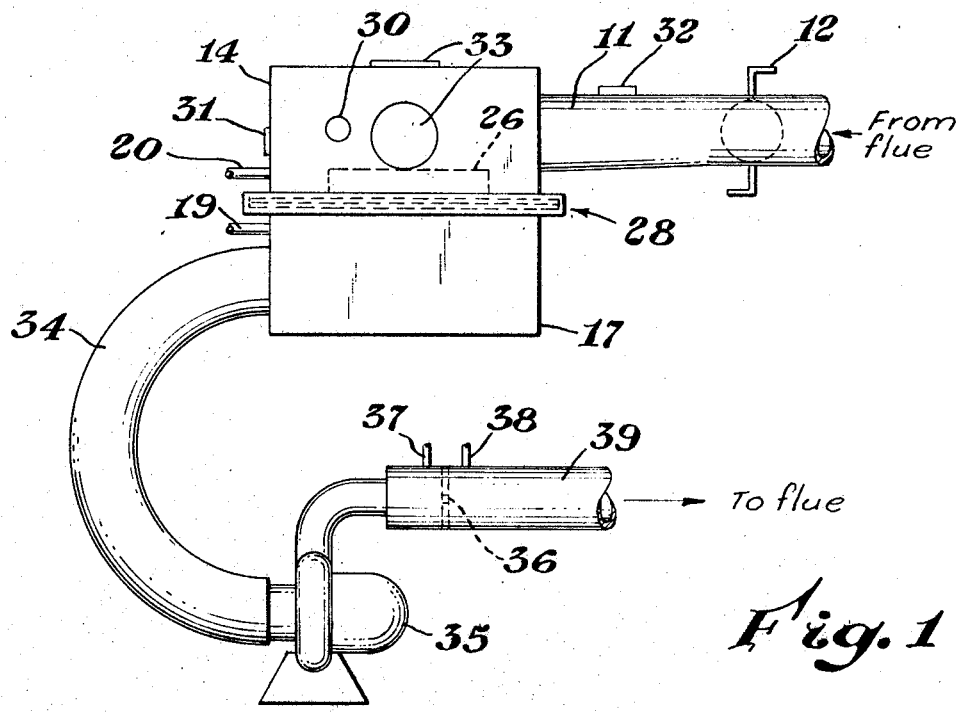

The instant invention is concerned with the elimination of polluting constituents from gaseous combustion products, e.g., flue gases. The invention is particularly directed to the separation of fly ash from flue gases and in a special embodiment it is directed to the simultaneous separation of fly ash and sulfur dioxide.

The problems of air pollution, as a result of the venting of combustion products, have been long recognized and are targets of much current research. Among techniques used to separate fly ash from flue gases are a variety of gas filters, dynamic air-solids separators, wet scrubbers, and electrostatic precipitators. Although effective to a degree, substantial improvement is possible in each of the foregoing techniques, especially in regard to recovery efficiencies for small particle sizes. Moreover, such systems have little effect on sulfur dioxide.

The art on sulfur dioxide removal from flue gases is replete with suggestions for washing the flue gases with aqueous solutions of alkaline materials. There is also suggestion for the separation of sulfur dioxide on solid absorbents such as calcium and sodium carbonate. Because sodium carbonate reacts slowly with sulfur dioxide at normal flue gas temperatures, there have been recent proposals to contact the flue gases with a molten bath of sodium carbonate. The carbonate is used at the higher temperature to enhance its rate of reaction.

Schemes currently under contemplation for simultaneously separating fly ash and sulfur dioxide from flue gases involve multi-step absorption and regeneration unit operations. For instance, a recent proposal of the U.S. Bureau of Mines involves the use of alkali-alumina as the contact absorbent. The alumina is then regenerated in a subsequent step for recycle, with the production of sulfur as a byproduct. Fly ash is separated in still another unit operation by the use of a cyclone solids separator operated in series with the absorption process unit. Similar processes have been proposed in which activated carbon and manganese dioxide are used as the absorbent.

Some systems proposed for clarification of flue gases involve solids separating devices in series with means for the catalytic oxidation of sulfur components of flue gases to produce byproduct sulfuric acid.

In general, it appears that the art has principally centered on unit operations which achieve separation of one or the other of fly ash and sulfur dioxide from flue gases. It would be especially desirable to achieve both separations in a single contact step. Moreover, although the efficiency of currently available air-solids separatory techniques is good with respect to the larger particles of fly ash, there is still a need for processes to more efficiently separate particles to submicron sizes.

Schemes to separate sulfur dioxide from flue gases generally involve absorption and absorbent regeneration stages. Useful byproducts are obtained upon regeneration of the absorbent. It would be desirable to achieve the separation of sulfur dioxide in a single stage operation, which directly produces a useful byproduct.

The principal objects of the instant invention are to promote progress in the aforementioned desiderata of the art and to provide a flue gas treatment which is both economical of operation and potentially capable of producing returns on investment in the form of useful, saleable products. Especially, it is an object to provide a treatment readily adaptable to existing combustion facilities. Special features under the basic process of the invention include the provision of a continuous one-stage contact process; variations in conditions to optimize simultaneous solids and sulfur dioxide separation and providing a filtration operation with relatively low draft requirements.

In accordance with the present invention, flue gases, otherwise sometimes termed stack gases, are filtered through a thin, porous bed of alkali metal bicarbonate crystal particles, at a temperature within the range from about 0° up to about 125° C. Essential to the efficient separation of fly ash is the condition that the bicarbonate crystal particles have a mesh size predominantly within the range from about 20 to 120, preferably from about 40 up to 100 mesh of the U.S. Standard Sieve series. As used herein, the crystal particles may be individual crystals of the bicarbonate or polycrystalline aggregates, which are sufficiently cohesive to essentially retain a sized, particular form during the mechanical handling incidental to the practice of the invention.

Effective fly ash separations will be achieved in beds as thin as 2 millimeters, particularly when using particle sizes within the preferred limits, but substantially higher thicknesses are tolerable without engendering excessive pressure drops. For reasons not fully understood, the bicarbonate crystals apparently attract, and hold on their surfaces, fly ash particles to submicron sizes. The latter has been concluded from studies of photomicrographs of the trapped particles.

A further embodiment of the invention arises from the discovery of an efficient gas-solid contact reaction between the bicarbonate and acidic gases, such as sulfur dioxide, in the flue gas. Although the temperature of the gas has been found to have a pronounced effect, within certain narrow ranges, on both the rate of reaction and the nature of the product produced, the sulfur dioxide nevertheless reacts very rapidly with dry bicarbonate crystals over the entire indicated temperature range.

Generally, effective sulfur dioxide removals can be achieved at space velocities up to as much as 6000 reciprocal hours or more. Space velocity ($V_s$) is defined herein according to the formula:

$$V_s = \frac{\text{volume of gas per hour at 0° C. and 760 mm. Hg}}{\text{volume of the bicarbonate bed}}$$

In other terms, effective removals of sulfur dioxide can be achieved in filter beds from about 10 mm. to about 40 mm. thick at reasonably rapid gas flow rates. Thus, by control of the bicarbonate particle size and bed depth or gas flow rate, a filter is provided in which the efficient separation of both fly ash and sulfur dioxide is achieved.

During operation, the filter medium undergoes two changes. One is essentially a physical-mechanical change affecting the pressure drop across the bed as trapped particles of the fly ash coat the bicarbonate crystals and fill in the interstices of the filter medium. The second change is in the chemical composition of the bed, which change is progressively less complete from top to bottom. At some point in time, dictated either by an excessive pressure drop or breakthrough of sulfur dioxide, the bed is reconstituted to maintain efficient filtration.

The reaction products of sulfur dioxide with the alkali metal bicarbonates will vary according to the temperature of the bed. At the lower temperatures, the new products will be substantially metabisulfites. As the temperature of the gas increases, sulfites and then sulfate become the predominant product formed.

In one optional embodiment of the invention, the bicarbonate filter is utilized in conjunction with a superimposed layer of porous fly ash particles having a screen size within the range from about 30 to about 100 mesh, U.S. Standard Sieve series. Because of its porosity, the fly ash is an excellent filter for separating solid constituents from a gas stream with a minimal pressure drop. The extra layer on top of the bicarbonate results in the recovery of the fly ash within a fly ash layer, thus minimizing problems in respect of the separation of fly ash from the reacted bicarbonate.

Flue gases to which the invention is especially applicable are the combustion products of fuels such as coal and fuel oil which produce fly ash and often substantial amounts of acidic gases. Most common among these gases is sulfur dioxide. Other acidic gases removed from gaseous combustion products, in a similarly efficient manner, are sulfur trioxide, hydrogen chloride and hydrogen bromide. Various subembodiments of the invention are more fully illustrated in respect of apparatus necessary to their practice in the accompanying drawings.

Figure 2:
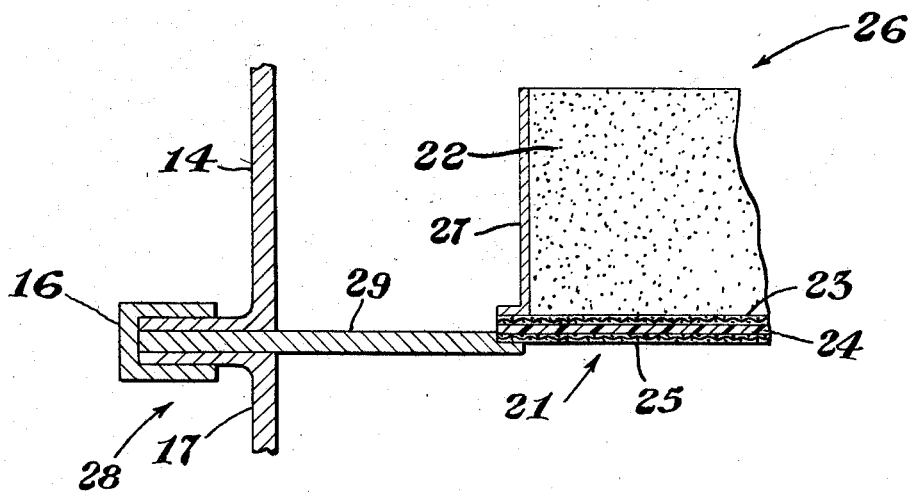

Particularly, FIGURE 1 is a detailed schematic illustration of apparatus for evaluation of the filtering process as applied to a gas stream having a relatively low flow rate. FIGURE 2 shows the filter bed construction in more detail.

Figure 3:
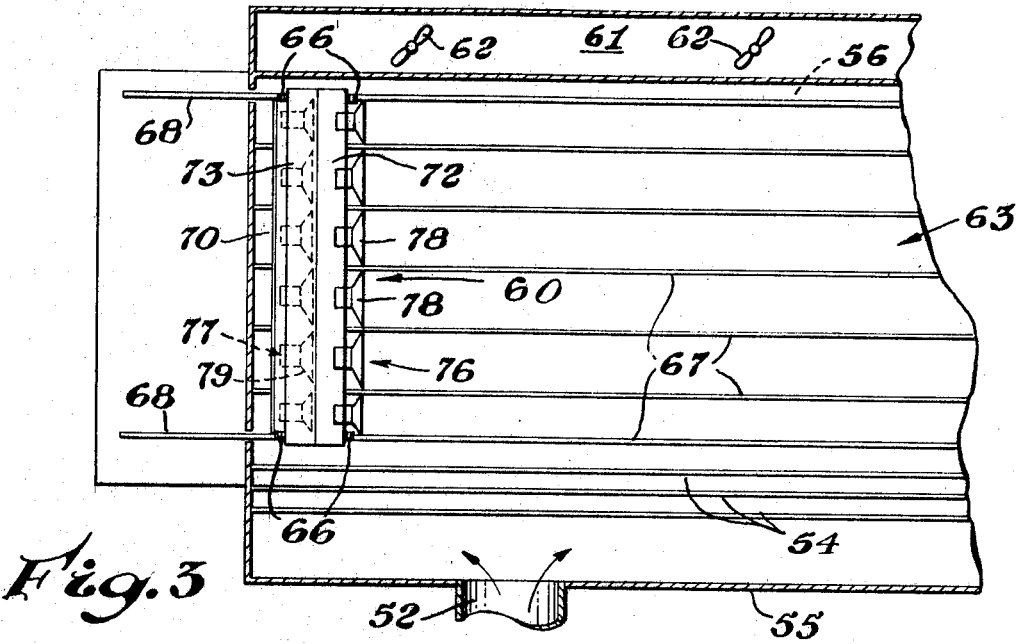
Figure 4:
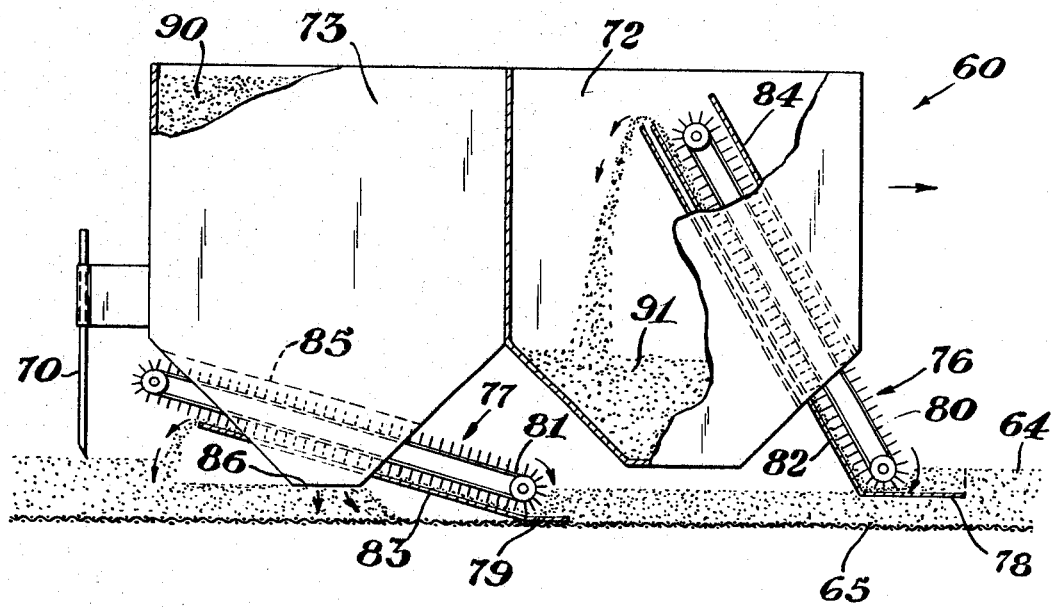
Figure 5:
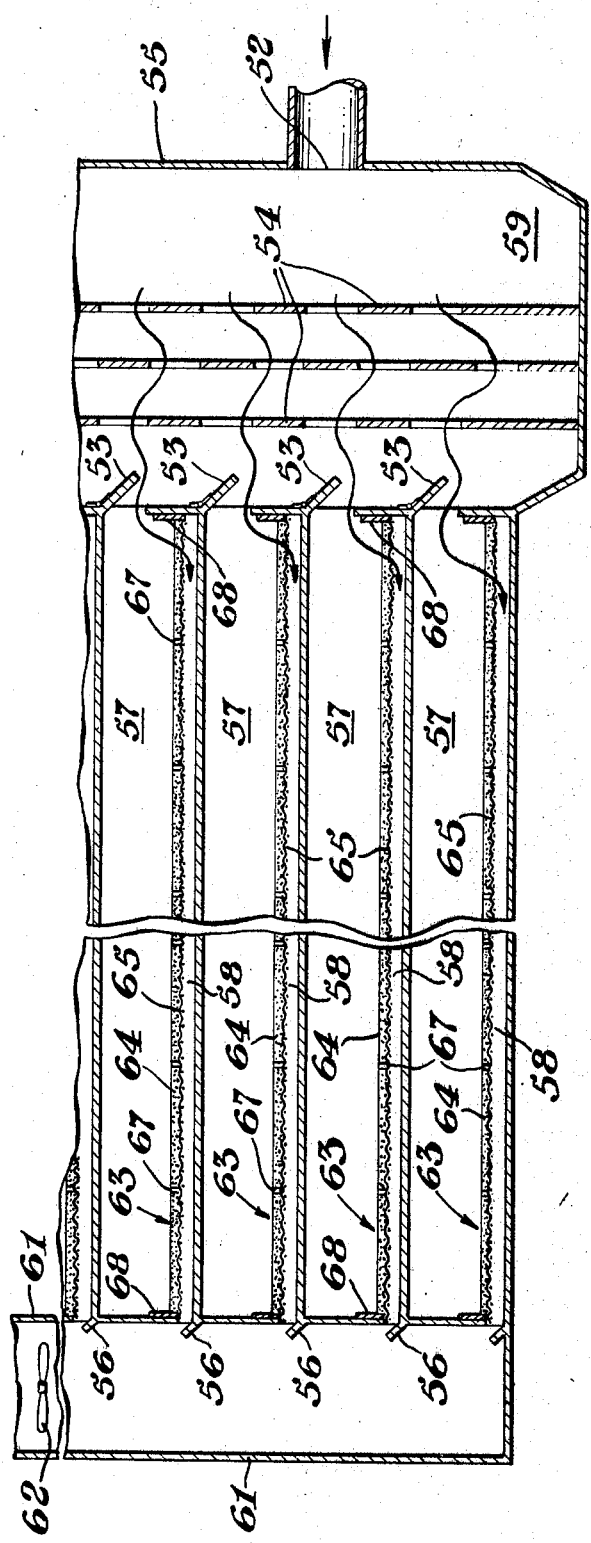

FIGURES 3, 4 and 5 are diagrammatic sectional views of apparatus applicable to large scale, continuous operations, including elevation and plan views, FIGURES 5 and 3, respectively, of a parallel filter arrangement for the continuous filtration of high volumes of flue gas and an elevation of a filter bed recharging apparatus, FIGURE 4.

Whenever possible, the same reference numbers are used to indicate the same element appearing in the different views. It should be understood that the drawings are not to scale and, when desirable to show details more clearly, a given apparatus or element thereof may be depicted in more than one scale.

The flue gas filtering apparatus illustrated in FIGURES 1 and 2 comprises upper and lower filter housing chambers 14 and 17. Each of these units is flanged for connection at flange joint 28 which is sealed by means of a circumferential U-shaped seal strip 16. Between the flanges is placed a rigid filter support 29, in the form of a metal sheet adapted to contain a circular filter assembly 26. The upper housing chamber 14 has an inlet duct 11 equipped with a damper 12. Both the upper housing chamber 14 and inlet duct 11 are equipped with electrical strip heaters 31 and 32, respectively. The sides of the upper housing chamber 14 are also fitted with windows 33 and a dial thermometer 30, for special observations. Gas is evacuated from the assembled filter housing through duct 34 by means of blower 35. Means for measuring the rate of gas evacuation is provided on the blower outlet 39, in the form of an orifice 36 and manometer vents 37 and 38. The pressure drop across the filter assembly 26 is measured by means of a manometer, not shown, through vents 19 and 20.

The circular filter assembly 26 comprises a gas permeable filter support 21 on which is placed a thin layer of an alkali metal bicarbonate as the filter medium 22. The bicarbonate is confined to the filter support assembly 21 within a circular wall member 27. The illustrated filter support 21 comprises compacted layers of fiber glass 24, compressed to approximately ⅜ inch between wire screens 23 and 25. The filter support 21 is clamped at its periphery, by conventional means not shown, between the circular wall member 27 and the filter support 29.

Inasmuch as the apparatus of FIGURES 1 and 2 is designed essentially for the demonstration and evaluation of process parameters of the invention, it should be understood that the above described apparatus incorporates design features not essential to the practice of the invention.

Fly ash and sulfur dioxide removals evaluated

In one series of runs, an apparatus similar to that described above was utilized to evaluate several different filter media of sodium bicarbonate crystalline solids. A glass beaker approximately 30 mm. in diameter was cemented to the filter support 21 at its middle to allow observation of fly ash penetration of surrounding bicarbonate filter medium. A given filter 26 was constituted by placing sufficient classified sodium bicarbonate crystals on the filter support 21 to a desired depth. The upper filter housing chamber 14 was then heated by means of the strip heaters 31 and 32 to prevent condensation of moisture on the crystals of the filter medium upon admitting the moisture-containing flue gas.

Once the chamber was up to operating temperature, i.e., above the dew point of the flue gas, the blower 35 was turned on and the damper 12 in the inlet duct 11 opened to allow entry of flue gases. The flow rate was adjusted by control of the blower speed. The pressure differential across the filter 26 was measured in terms of centimeters of water. Moist strips of blue litmus paper and iodic paper were placed in the lower filter housing chamber 17 through access ports not shown as sensors for the presence of acidic gases. The paper was so sensitized that 10 parts per million of sulfur dioxide produced a definite color change in the paper.

In one run, 633 grams of sodium bicarbonate having a mesh size predominantly in the range from 40 to 100 U.S. Standard Sieve series, was placed on the filter support 21. This gave a filter medium 22 with a depth of approximately 24 millimeters. A flue gas was flowed through the filter 26 at approximately 51.7 liters per minute for the first 2 hours of operation and thereafter at 56.3 liters per minute. The flue gas composition varied during the course of the operation but was believed to have an average composition of approximately, on a volume percent basis, 72.6 percent nitrogen, 14.6 percent carbon dioxide, 8.8 percent water vapor, 2.8 percent oxygen, 0.9 percent argon, 0.1 percent nitrogen oxide and 0.17 percent sulfur dioxide.

After about 2 hours of operation, the top of the filter medium 22 had turned dark brown from a uniform deposit of fly ash. The flow of flue gas through the filter 26 was continued for a total of about 8 hours. During this period, the temperature within the upper filter chamber ranged from about 72° C. up to a maximum of about 116° C., averaging approximately 110° C. At the end of the run, sulfur dioxide still had not broken through the filter medium 22.

The initial pressure drop across the filter was 7.5 centimeters of water and this gradually increased during the run to approximately 15.8 centimeters of water.

At the end of the run, the depth of penetration of fly ash into the sodium bicarbonate was observed directly through he beaker in the center of the filter medium 22. The fly ash appeared to be substantially contained within the first 1–2 millimeters at the medium's surface. Removal of 27 grams of the filter medium 21 uniformly from the top appeared to remove most of the trapped fly ash as evidenced by the bright white surface of the crystals uncovered. X-ray diffraction analysis of this sample indicated sodium sulfate to be a major constituent, with an estimated presence of approximately 5 to 10 percent of unreacted sodium bicarbonate.

A portion of this initial layer was also analyzed for its water-insoluble fly ash content by dispersing a sample in water, centrifuging the resulting solution, washing the sediment and re-centrifuging. The dry fly ash solids (assuming no insolubles in the bicarbonate) were calculated to be 21.2 percent by weight of the sample, as removed from the filter. Photomicrographs of the fly ash solids thus recovered from the filter revealed the entrapment of particles to submicron sizes. Photomicrographs were taken directly of bicarbonate crystals on which fly ash was trapped. These also indicated the entrapment of many particles to submicron sizes.

The results of the X-ray diffraction analysis of each of the layers removed from filter beds are set forth in the following table.

TABLE I

| Layer No. | Thickness [1] (mm.) | Amount, gms. | Product analysis,[2] percent | | Percent | | |
|---|---|---|---|---|---|---|---|
| | | | $NaHCO_3$ | $Na_2CO_3 \cdot H_2O$ | Trona [3] | Burkeite [4] | $Na_2SO_4$ |
| 1 | 1+ | 27 | 6 | | | | 73 |
| 2 | 3 | 58 | 6 | | 7 | 35 | 45 |
| 3 | 3 | 51 | 6 | 12 | 12 | 35 | 35 |
| 4 | 5 | 90 | 11 | 17 | 17 | 55 | |
| 5 | 8 | 190 | 25 | 25 | 25 | 25 | |
| 6 | 4 | 117 | 33 | 33 | 33 | | |

[1] The thickness of the layer was determined by direct measurement from the top of bed and also estimated from bulk density.
[2] Product analyses are approximate with estimated error of ±10%.
[3] Trona has the formula $Na_2CO_3 \cdot NaHCO_3 \cdot 2H_2O$.
[4] Burkeite has the formula $2Na_2SO_4 \cdot Na_2CO_3$.

From the above data, it is evident that the filter medium was only about half spent in terms of bicarbonate available for reaction with sulfur dioxide. Since the degree of reaction decreases in descending through the filter bed, the weight per unit layer will vary across the bed. Removal of the first 1-2 millimeters of the bed effectually restores the original pressure drop. There was no trace of fly ash on the filter support. Sulfur dioxide was effectively trapped in approximately the first 20 millimeters of the bed. The space velocity for this portion of the bed was 4820 reciprocal hours.

In other runs carried out in a similar manner, filter media were evaluated utilizing sodium bicarbonate crystalline solids at sizes within the classification ranges from 8 to 20 and 20 to 40 mesh. The larger particle size classification allowed penetration of fly ash through the entire bed. Particles from 20 to 40 mesh efficiently trapped most of the fly ash but it was distributed throughout most of the bed, rather than in the first 1-2 millimeters as was the case with the 40 to 100 mesh size. However, the capacity of the bed in respect of the sulfur dioxide trapped prior to breakthrough was substantially decreased, because of decreased reactive surface area in relation to bicarbonate mass.

In addition to sodium bicarbonate, potassium bicarbonate has been successfully employed in similar filtration operations. Also useful are minerals composed in part, or predominantly, of alkali metal bicarbonate, which have been ground to a suitable particle size.

In view of the above data, simultaneous filtration of flue gas and separation of sulfur dioxide therefrom is most efficiently achieved in bicarbonate beds from 10 mm. to about 40 mm. deep, with mesh sizes of the bicarbonate crystals or aggregates thereof within the range of about 20 to 120, preferably about 40 to 100, U.S. Standard Sieve series. Periodic removal or plowing, e.g., every 30 to 60 minutes or so, of the first few millimeters of the bed will enable more extended utilization of the bicarbonate without creating excessive pressure differentials.

Pressure drop evaluation

A series of experiments was run to illustrate the high gas permeability of sodium bicarbonate crystals. Glass tubes of 11 millimeters inside diameter were filled to a depth of 25 mm. with sodium bicarbonate of varying particle size classifications. Nitrogen was flowed through the tubes at the rate of 165 milliliters per minute (barometric pressure at 751.69 millimeters of mercury; temperature at 24° C.). The test was first run on loosely packed tubes and then on tubes which had been shaken to more firmly compact the bicarbonate medium. The pressure drops ($\Delta P$) for the "loose" and "compacted" beds are set forth in the following table. Also shown is some comparative gas permeability data in respect of other particulate matter.

TABLE II.—FILTER MEDIA SPECIFICATIONS

| Filter Composition | Mesh size | | Loose $\Delta P$ (cm. of $H_2O$) | Compacted $\Delta P$ (cm. of $H_2O$) |
|---|---|---|---|---|
| | Through | On | | |
| $NaHCO_3$ | 325 | | 6.0 | 11.7 |
| $NaHCO_3$ | 200 | 325 | 4.1 | 9.0 |
| $NaHCO_3$ | 140 | 200 | 2.4 | 4.7 |
| $NaHCO_3$ | 100 | 140 | 1.7 | 2.8 |
| $NaHCO_3$ | 80 | 100 | 1.1 | 2.0 |
| $NaHCO_3$ | 50 | 80 | 0.4 | 0.8 |
| $NaHCO_3$ | 30 | 50 | 0.2 | 0.5 |
| Carbonaceous fly ash | 30 | 80 | 0.2 | 0.3 |
| Do | 14 | 80 | 0.05 | 0.1 |
| Silica sand | 50 | 100 | 2.7 | 5.3 |
| $\alpha$-$Al_2O_3$ (corundum) | 50 | | 1.5 | 3.7 |

It is apparent from the foregoing that the bicarbonate crystals and classified porous fly ash are highly permeable as compared to other commonly used filter media.

Continuous operations

An apparatus for large scale, continuous gas filtering operations in accordance with the invention is illustrated in FIGURES 3, 4 and 5. FIGURES 5 and 3 are, respectively, elevation and plan views of an arrangement of a plurality of alkali metal bicarbonate filters adapted for parallel operation. FIGURE 4 is a sectional view of a filter bed recharging apparatus. The same reference numbers are used whenever an element appears in more than one view.

The filter beds 63, as shown in FIGURE 5, comprise an alkali metal bicarbonate filter medium 64 uniformly spread over a gas-permeable filter support 65 in the form of a screen. At the inlet end of a given filter bed 63 is a gas distributing header 55. At the outlet end is a flue 61 through which the filtered gases are vented to the atmosphere. Fans 62 are employed in the flue 61 to maintain an induced draft through the filter beds 63.

Within the gas distributing header 55 are a series of staggered baffles 54. These cause deflections in the flow path of flue gas entering through inlet 52 thereby aiding in the settling of larger fly ash particles. They are recovered in fly ash trap 59.

Gas to be filtered enters a plenum chamber 57 communicating with the gas distributing header 55 above each filter bed 63. After passing through the filter bed 63, the gas enters a second plenum chamber 58 communicating with the flue 61. At the inlet of the plenum chamber 57 and the exit of plenum chamber 58 are control dampers 53 and 56, respectively.

In FIGURE 3, one filter bed 63 is shown in plan view. Shown in this view are leveling guides 67 which run laterally across the filter bed 63. These rigid, leveling guides rise to a uniform height above the filter support 65. Shown at one end of the filter bed 63 is a filter bed recharger 60 which consists of a first hopper 72 and a second hopper 73. These hoppers 72 and 73 extend lengthwise over the filter bed 63 and are fitted at each end with wheels 66 to roll over supporting tracks 68.

The first hopper 72, as better illustrated in the sectional view of the filter bed recharger 60 shown in FIGURE 4, receives discharge 91 from a first continuous pickup conveyor 76, which scoops and conveys to the interior hopper 72 a certain fraction of the used bicarbonate filter medium 64. The remaining partially used portion of the bicarbonate filter medium 64 is scooped up by means of a second continuous conveyor 77. This returns the bicarbonate filter medium to the filter 63 as a top layer over a fresh charge of bicarbonate 90 supplied from the second hopper 73. The latter is laid on the filter support 65 from a discharge vent 86 along the bottom of hopper 73.

Each of the continuous conveyors 76 and 77 have grading scoop edges 78 and 79, respectively. These edges cut through the bicarbonate filter medium 64 at a given level. Endless scraper-belts 80 and 81 on each of the continuous conveyors pushes accumulated filter medium along chutes 82 and 83. Chute 82 extends into hopper 72 through a hopper well 84 and discharges the recovered used filter medium 91 into the interior of the hopper 72. Chute 83 extends through a conduit 85 in hopper 73, terminating at a position just ahead of the following grader blade 70, which is attached along the rear side of hopper 73.

To start up operation of the illustrated parallel filter arrangement, the series of parallel filter beds are charged with dry alkali metal bicarbonate crystals or crystal aggregates, preferably sodium bicarbonate crystals. As previously indicated, the individual crystals, or aggregates thereof sufficiently cohesive for mechanical handling in the practice of the invention, preferably have a mesh size in the range of about 40 to 100 of the U.S. Standard Sieve series. They are placed on the filter support 65 and graded to a uniform depth as determined by the leveling spacers 67. This will commonly be about 25 millimeters but may vary considerably depending upon the availability of draft and flow rates of the gas to be processed.

The charging of the filter medium can be accomplished by means of a conveyor grader such as the illustrated filter bed recharging apparatus 60. For this initial charge it will be operated, without using the pickup conveyors, to deposit a uniform charge of filter medium 64 on the filter bed support 65. The grading bar 70 will level the filter medium to the precise height of the leveling guides 67 above the filter bed support. In this manner, filter beds will be formed at a uniform depth to assure an initial uniform pressure drop. This in turn will minimize gas channeling and achieve more uniform utilization of the filter medium.

Heated air is then circulated through the filter bed, as necessary, to bring it up to about the operating temperature, i.e., the temperature of the flue gas. This step may be omitted if the moisture content from the gas to be filtered is below its dew point at the temperature of the filter beds. Otherwise, water may condense on the filter medium to delay the onset of efficient solids and sulfur dioxide separation until the flue gas has itself heated and dried the filter bed.

Gas to be filtered containing fly ash is passed into the distributing header and thence divided in several streams which pass through the filter beds in parallel at a space velocity within the range from about 2000 to about 6000 reciprocal hours. An induced draft to maintain desired filtration rates is applied by means of the fans 62. For most operations an induced draft of about 5 to 15 centimeters of water is sufficient to give the desired space velocity.

The number of such filter beds used in the illustrated parallel arrangement will depend upon the volume of gas to be filtered and the area of the bed employed. Increases in either of these parameters, of course, permits a decrease in the other. It is contemplated that as many as 10 or more filter beds with areas up to as much as 1000 square meters will be used to clarify the flue gas from a large power plant burning 1500 tons of coal per day. As will be apparent to those skilled in the art of filtering flue gases the controllable variables of design will allow for many variations on the basic concepts of the instant invention without departing from the spirit and scope thereof.

To keep the filter beds in continuous operation it is necessary to place the beds on a cyclical recharge schedule, recharging of each bed occurring on an incremental time bases so as to permit completion of one recharge cycle within the effective life of one bed. Depending upon such operating conditions as the space velocity and the fly ash and sulfur dioxide contents of influent gas, filter beds constituted in a manner indicated above can have a life for the simultaneous separation of fly ash and sulfur dioxide anywhere from one up to as much as twenty hours or more. Their life depends principally upon their depth, which is largely regulated by allowable pressure drops.

In a preferred mode of recharging a bed used for both fly ash and sulfur dioxide removal, the dampers at each end of the filter bed are closed and side doors, not illustrated, are opened immediately adjacent the one bed to be recharged. The filter bed recharging apparatus 60 is then passed laterally from one side to the other of the filter bed, moving along on tracked wheels and removing and replacing the filter medium in two layers as it so moves. The first layer of used medium is removed and stored in hopper 72. The second layer is picked up and, before returning it to the filter bed, a fresh layer of bicarbonate crystals is applied to the filter support 65 to a depth which is approximately ½ the total depth of the desired filter bed. The second endless conveyor then returns the partially used filter medium to the top of the fresh bicarbonate and the composite bed is graded to a uniform depth by the leveling blade 70 guided over the leveling guides 67.

The tracks 68 over which the filter bed recharger 60 is drawn extend beyond the filter bed 63 on each end to allow for the complete traverse of the bed. Once the bed has been charged, the recharging apparatus 60 is removed from one bed and placed on the tracks of the next bed to be recharged. The end doors for the bed just recharged are closed and the bed allowed to heat up to an operating temperature before being placed on stream by opening the control dampers. The heating may be accomplished with the ambient heat of adjacent operating filters. Alternately, the heating step may be avoided by preheating the bicarbonate prior to emplacement in the filter bed.

The used filter medium recovered from the filter consists of essentially a particulate admixture of fly ash and reaction products of sodium bicarbonate and sulfur dioxide. According to the temperature of the flue gas, the latter will vary among products of predominantly sodium metabisulfite, sodium sulfite or sodium sulfate. Sodium metabisulfite is formed predominantly in the range from about 0° C. to about 30° C. For sodium sulfite, the preferred temperature is within the range from about 30° to about 70° C. Sodium sulfate is formed within the temperature range from about 70° to about 125° C. These products can be purified by any one of several known conventional separatory techniques to provide a useful and saleable by-product of the filtration process of the instant invention.

What is claimed is:

1. A method for filtering flue gas to remove fly ash and sulphur dioxide therefrom which comprises flowing the gas, at a temperature within the range from about 0° C. up to about 125° C. through a thin, porous bed containing alkali metal bicarbonate crystalline solids having a mesh size predominantly within the range from about 20 up to about 120 mesh U.S. Standard Sieve series.

2. A method as in claim 1 wherein the gas is passed through the bed at a space velocity less than about 6000 reciprocal hours, whereby acidic gases are efficiently removed.

3. A method as in claim 2 wherein the alkali metal bicarbonate is sodium bicarbonate.

4. A method as in claim 1 wherein the mesh size of the crystalline solids is within the range from about 40 up to 100 mesh U.S. Standard Sieve series and the alkali metal bicarbonate is sodium bicarbonate.

5. A method as in claim 4 wherein the temperature of the filter bed is maintained at a temperature above the dew point of the flue gas.

6. A method as in claim 4 wherein the thin porous bed has a depth within the range from about 10 up to about 40 millimeters.

7. A method as in claim 1 wherein the pressure drop across the bed is maintained at a level less than about 20 centimeters of water.

8. A method as in claim 6 and including the additional step of periodically plowing the first 1–2 millimeters of the porous bed surface to maintain a minimal pressure drop.

9. A method as in claim 1 and including the additional step of periodically removing the first 1–2 millimeters of the bed to maintain the pressure drop across the bed below about 20 centimeters of water.

10. A method as in claim 1 and including the additional step of recovering an alkali metal salt of any oxyacid of sulfur from the filter medium.

11. A continuous filtering process for removing fly ash and sulphur dioxide from a flue gas which comprises flowing the gas at a temperature within the range from about 0° C. to about 125° C. through a parallel, plurality of thin, porous beds containing a filter medium of an alkali metal bicarbonate crystalline solids of a mesh size predominantly within the range from about 20 up to 120 mesh U.S. Standard Sieve series.

12. A method as in claim 11 and including the additional steps of periodically withdrawing each bed from filtering service on a cyclical basis, recovering reacted filter medium, recharging the bed with active filter medium and then returning the bed to service.

13. A method as in claim 11 wherein the filter bed of alkali metal bicarbonate is from about 10 to 40 millimeters thick and the filter medium is removed after use in at least two layers and the filter medium is replaced with at least two layers of bicarbonate crystals, a lower layer of the recharged bed being of fresh alkali metal bicarbonate and an upper layer, being of a partially used filter medium recovered from a previously used lower layer.

14. A method as in claim 11 wherein the alkali metal bicarbonate is sodium bicarbonate.

15. A method as in claim 11 wherein the temperature of the filter bed is above the dew point of the flue gas and space velocity of the gas through a given bed is less than about 6000 reciprocal hours.

References Cited

FOREIGN PATENTS 18,775   2/1889   Great Britain.

O. R. VERTIZ, Primary Examiner

E. C. THOMAS, Assistant Examiner

U.S. Cl. X.R.

23—129, 130, 178; 55—73, 74, 98